United States Patent [19]
Buczek et al.

[11] 3,790,278
[45] Feb. 5, 1974

[54] PEAKED POWER COHERENT PULSED LASER TRANSMITTER/RECEIVER SYSTEM

[75] Inventors: Carl J. Buczek, Manchester; Michael L. Skolnick, West Hartford; Gary E. Gurski, Manchester, all of Conn.

[73] Assignee: United Aircraft Corporation, East Hartford, Conn.

[22] Filed: Apr. 26, 1972

[21] Appl. No.: 247,678

[52] U.S. Cl................. 356/28, 343/8, 343/17.1 PF, 356/5
[51] Int. Cl.......................... G01c 23/00, G01s 9/44
[58] Field of Search .... 356/4, 5, 28; 343/8, 17.1 PF

[56] References Cited
UNITED STATES PATENTS

| | | | |
|---|---|---|---|
| 3,647,298 | 3/1972 | Soules | 356/4 |
| 3,195,129 | 7/1965 | Fishbein et al. | 343/8 |
| 3,234,548 | 2/1966 | Colby, Jr. | 343/8 |
| 3,123,823 | 3/1964 | Schreitmueller | 343/8 |
| 3,611,182 | 10/1971 | Treacy | 356/5 |
| 3,454,775 | 7/1969 | Gibbs | 356/28 |

OTHER PUBLICATIONS
Radar Handbook, M. I. Skolnick, 1970, McGraw–Hill pp. 2-6, 2-13.

*Primary Examiner*—Maynard R. Wilbur
*Assistant Examiner*—H. A. Birmiel
*Attorney, Agent, or Firm*—Melvin Pearson Williams

[57] ABSTRACT

In a coherent pulsed laser radar system employing state-of-the-art laser technology, optical technology and microwave radar video signal processing technology, the radar receiver is provided with a bandwidth which is commensurate with doppler frequencies in radar return signals resulting from unresolved target return signal doppler shifts. These unresolved doppler shifts are on the order of magnitude of those resulting from targets having ground speeds on the order of tens of miles per hour. The above said bandwidth being orders of magnitude larger than that required for the data rate of return signals. The pulsewidth of the transmitter is designed to be matched (substantially the reciprocal) to the aforementioned large bandwidth, whose function is determined by the shape of the transmitted pulse. The PRF is chosen to be the lowest possible commensurate with the data rate. In one embodiment, a 10.6 micron carbon dioxide laser transmitter is passively Q-switched by a low pressure gas saturable absorber, such as a sulfer hexafluoride cell, giving an output pulse having a pulsewidth on the order of roughly one tenth microsecond to one microsecond, and the receiver has bandwidth of approximately one half to three MHz, operating at a nominal IF center frequency of 30 MHz, with receiver information rates on the order of 20-50 KHz, the local oscillator being adjusted with respect to the ground velocity of the laser radar so as to provide radar video at substantially the IF frequency falling within the bandwidth, as described hereinbefore.

1 Claim, 1 Drawing Figure

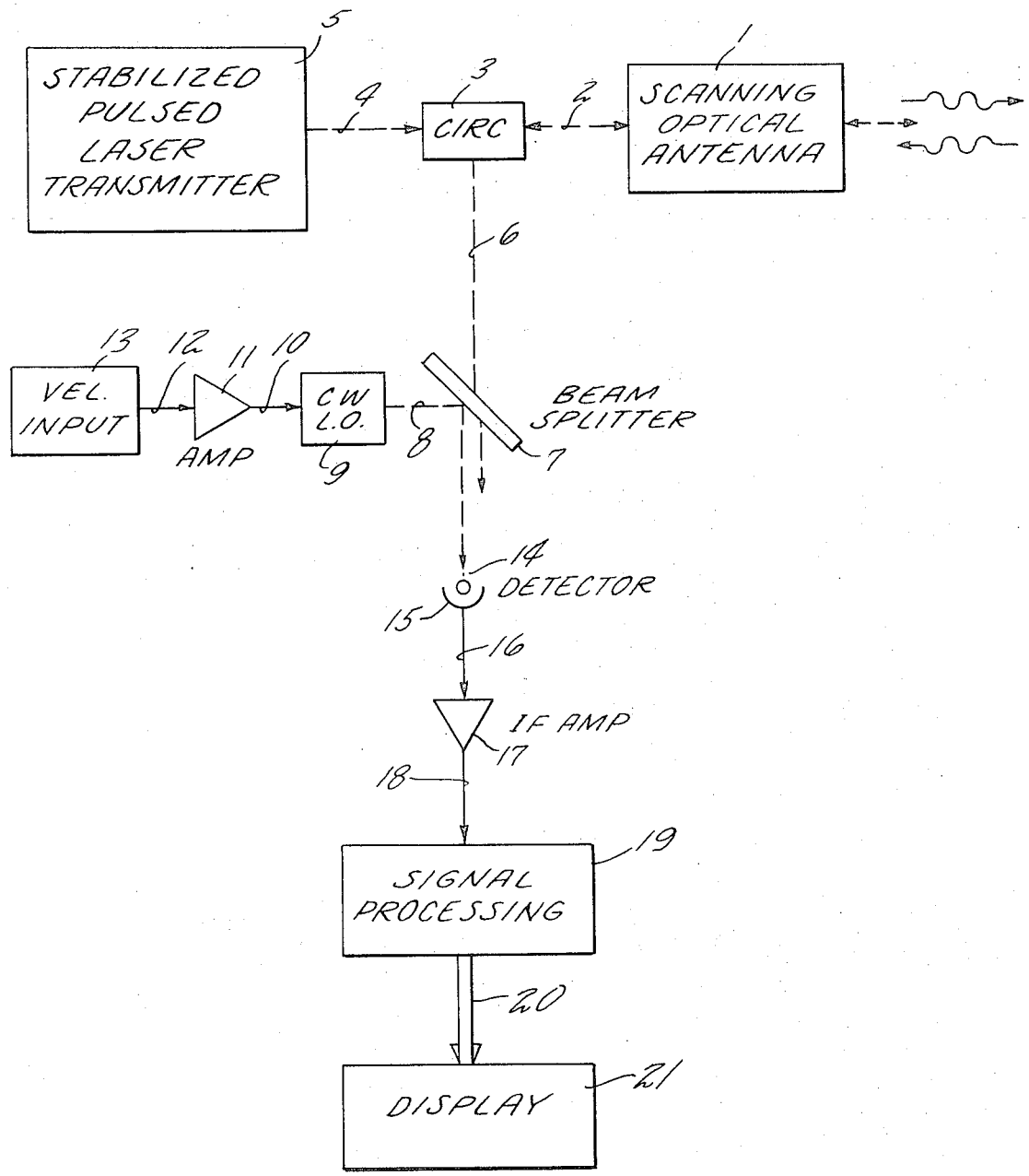

PEAKED POWER COHERENT PULSED LASER TRANSMITTER/RECEIVER SYSTEM

BACKGROUND OF THE INVENTION

1. Field of Invention

This invention relates to laser transmitter/receiver systems, and more particularly to laser systems having an enhanced peak power to average power ratio without suffering any unrequired increase in bandwidth of the receiving system. The invention is suited to communications uses, and is particularly suited to use in laser radars adapted for relative motion with respect to the earth, such as on a vehicle.

2. Description of the Prior Art

It is well known in the radar arts that microwave and, to a lesser extent, millimeter radars suffer from certain performance characteristics which render them useless in detecting and resolving small or closely spaced targets, or in detecting targets which are very close to the radar. The resolution of microwave and millimeter radars is greatly incumbered due to the relatively wide beamwidth of the radar beam. As is known, this is overcome with super complex processing systems such as synthetic aperture radars, and to a lesser extent by monopulse radars which operate either on an amplitude differential, or on the phase interferometer principal with respect to a pair of beams displaced from each other in a plane within which the resolution is to be finer than is possible within the beamwidth of any individual beam.

Similarly, such radars suffer from the inability to discriminate between targets which are close to the radar due to clutter which affects microwave and millimeter radar receivers. It is known that such clutter does not exist at higher frequencies, such as the near visible spectrums at which laser radars can operate.

Thus, recent developments in very high resolution radars have been oriented toward optical or laser radars which operate in the infrared, visible and ultraviolet bands.

In defining characteristics of a laser radar which are desirable, it is to be understood that many of the parameters of microwave and millimeter radar are also applicable to laser radars. Particularly, once radar video has been established in the receiver, that is, once signals at a moderate frequency which represent target information returned to the radar have been developed, the processing is similar for radars utilizing any carrier frequency. In any radar or other communication system, a primary consideration is the signal to noise ratio which can be expected in the receiver. Regardless of how strong a received signal is, if it is swamped with noise, it becomes useless. On the other hand, the most delicate return signal can be useful provided it stands out sufficiently, in contrast with the noise which is generated within the receiver apparatus itself, to be clearly distinguishable. As is known, the power signal to noise ratio for an incoherent detection receiver is directly proportional to the square of the power in the return signal times some constant, and inversely proportional to the bandwidth of the receiver. On the other hand, it is also known that the power signal to noise ratio for a coherent detection receiver is directly proportional to the first order of the power in the returned wave times some second constant and inversely proportional to the bandwidth. On first glance it thus appears that the signal to noise ratio can be greater in an incoherent receiver. However, under proper operating conditions, (efficient heterodyning) the constant involved in a coherent detection receiver which depends only on the detector quantum efficiency and the energy per photon is several orders of magnitude higher than the constant in an incoherent detection receiver which depends on the area and detectivity of the detector. Thus, as is known, coherent detection receivers operable at infrared wavelengths are many orders of magnitude more sensitive (i.e., require orders of magnitude less return signal power to yield a specific moderate signal to noise ratio) for any given receiver bandwidth than is true for the incoherent detection receiver.

Another parameter related to the choice of a laser system is whether the laser transmitter should be pulsed or continuous wave (cw). Heretofore, it has been known that in a coherent system, whether the system be operated at microwave, millimeter or near optical frequencies, the receiver signal to noise power ratio is proportional to the average output power of the transmitter and therefore there is no advantage to operating a pulsed transmitter. The reason for this is that although the peak power output in a cw transmitter is equal to the average power output, and although a pulsed transmitter can have a peak power output many times greater than the average power output, the signal to noise ratio goes up with the return power (which is equal to the peak power in a pulsed system and is equal to the average power in a cw system), but goes down with the bandwidth which in turn is inverse to the pulsewidth. Thus the effects on increased peak power and bandwidth cancels out, and the signal to noise ratio will remain the same whether a high peak power to average power ratio and large bandwidth is used or whether a peak power equal to average power and small bandwidth is used.

In the instance of providing radar systems for airborne use, a need has developed for radar systems which can operate at short range and with high resolution. One specific example is terrain and obstacle avoidance radars for use on helicopters and other low flying, slow flying, or earth-related tactical aircraft. In an airborne system, it is quite obvious that high signal to noise ratio and low average power are to be sought after, in every practical way, so as to reduce the size, cost, weight and complexity factor in such systems.

SUMMARY OF INVENTION

The object of the present invention is to provide improved laser transmitter/receiver systems. Another object of the invention is to provide improved radar systems capable of high resolution at relatively short ranges. A further object of the present invention is to provide improved laser radar systems.

According to the present invention, a laser transmitter/receiver system employs a coherent detection receiver having a bandwidth which is in excess of the bandwidth required for the information rate of the system and instead is chosen to be large enough to accommodate a wide range of frequency shifts from the nominal transmitter carrier frequency, and employs a pulsed transmitter operated with a pulsewidth which is substantially the reciprocal of said large receiver bandwidth and a PRF which is as low as will accommodate the data rate requirements of the system.

According further to the present invention, a mobile, coherent detection, pulsed laser radar system employing state of the art laser technology, state of the art optical technology, and state of the art receiver signal processing technology is provided with a receiver bandwidth which is a function of unresolvable return signal doppler frequencies, resulting from variations in transmitter frequency, receiver local oscillator frequency, velocity of the radar carrying vehicle, and relatively slowly moving targets, and is provided with a pulse repetition frequency which is small with respect to the bandwidth of the receiver. More specifically, in accordance with the invention, the bandwidth of the receiver is taken to be substantially equal to twice the ratio of the carrier frequency to the speed of light times doppler velocity components which are taken to be unresolvable or varying within the design parameters and expected utility of the system, and a pulse repetition frequency is chosen to be less than some fraction of the aforementioned selected bandwidth. In a preferred embodiment of the invention, a passively Q-switched $CO_2$ laser has an output pulse having a Gaussian distribution of intensity with respect to time, and the PRF is less than the frequency bandwidth associated with the pulse amplitude function. In further accord with the present invention, a mobile 10.6 micron laser is passively Q-switched with a low pressure saturable dye absorber comprising a gas cell including sulfer hexafluoride, providing an output pulse having a pulse-width on the order of one-tenth to one microsecond, which is commensurate with a 1 to 3 MHz bandwidth, and utilizing a nominal radar receiver IF amplifier center frequency on the order of 20 to 40 MHz, the optical local oscillator being adjusted as a function of the velocity of the radar-carrying vehicle so as to cause the IF frequency to be within a small fraction of the bandwidth around center frequency of the IF amplifier.

The present invention, unlike the prior art, does not provide a receiver bandwidth which is selected in order to be a function of the reciprocal of the transmitter pulsewidth, but instead selects a transmitter pulsewidth which is commensurate with a bandwidth (much in excess of the bandwidth required for the information data rate) chosen to accommodate uncontrollable and indeterminable carrier frequency shifts, such as doppler shifts resulting from inability to accurately compensate for the velocity of the platform upon which the radar is mounted and variations in the velocity of targets relative to the ground, and from shifts in other laser radar parameters such as transmitter carrier frequency and so forth. This results from the fact that doppler frequencies get to be significant when the carrier frequency is extremely high, such as the near-optical carrier frequencies of laser radars. The invention provides the advantages of coherently detected pulse radars known to the prior art, such as ranging, backscatter discrimination, signal processing, etc, and the heretofore unavailable signal to noise advantage of a very high peak power to average power ratio resulting from the low transmitter PRF and very short pulsewidth, without suffering any cancelling penalties of unnecessarily increased bandwidth therefor.

By utilizing a radar receiver bandwidth which is much larger than that determined by the information rate (typically a reciprocal function of the pulsewidth,) so as to accommodate unresolvable doppler frequencies which may occur as a result of variations in ground velocity indication, moving targets such as wires blowing in the wind, and other unresolvable elements of relative velocity, coupled with a low data rate (low pulse repetition frequency), the ratio of peak power to average power can be significant (one or more orders of magnitude), in contrast with prior art continuous wave systems of a similar type in which the ratio of peak to average power is unity.

Other objects, features and advantages of the present invention will become more apparent in the light of the following detailed description of a preferred embodiment thereof, as illustrated in the accompanying drawing.

BRIEF DESCRIPTION OF THE DRAWING

The sole FIGURE herein comprises a simplified schematic block diagram of a laser radar in which the present invention may be incorporated.

DESCRIPTION OF THE PREFERRED EMBODIMENT

Referring now to the drawing, a coherent pulsed laser radar system which may employ the present invention includes a scanning optical antenna 1 which transmits electromagnetic energy in the near-optical spectrum, outwardly (to the right in FIG. 1) and receives return signals reflected from targets within the illuminated field of the antenna. The scanning optical antenna may typically comprise a fixed telescope with a rotating mirror, or any other suitable antenna operable at the desired wavelength. The antenna 1 is connected through an optical path 2 to a circulator 3 which performs the same function as do microwave circulators in microwave radars. The circulator 3 acts to pass energy on an optical path 4 from a stabilized pulsed laser transmitter 5, to the path 2 for transmission by the antenna 1, and acts to pass return signals received by the antenna 1 from the optical path 2 to an optical path 6 directed toward the receiver of the system. The circulator 3 may comprise a beam splitter consisting of a partially reflecting mirror, or consisting of a Faraday rotator, quarterwave plates and suitable polarizers, as is known in the art. Other devices known to the art may be employed, as desired. Separate transmit and receive antennas may be used if desired.

The return signals in the optical path 6 impinge on a beam splitter 7, which serves as a combiner or mixer to mix the return signals in the optical path 6 with the optical signals on a path 8 provided by a continuous wave laser local oscillator 9. The local oscillator 9 preferably comprises a low power, very stable laser, which is tuned to provide a signal which is separated in frequency from the frequency of the return waves on the optical path 6 by the center frequency of the IF amplification portion of the receiver, as described more fully hereinafter. The tuning of the local oscillator 9 may be performed in a well known manner by providing a suitable voltage to a transducer, such as a piezoelectric crystal, upon which one of the resonating mirrors of the resonant cavity of the local oscillator is mounted.

Control voltage for tuning the local oscillator 9 is provided on a signal line 10 by an amplifier 11 driven in turn by a signal on a line 12 provided by a velocity input means 13. The velocity input means may comprise any suitable velocity sensor. If the radar system is to be mounted on a vehicle, such as a helicopter or other aircraft, in a fashion so that it scans symmetrically about a single relative azimuth of the vehicle (such as its heading) then the velocity input means 13 need only detect speed of the aircraft to provide proper tuning of the local oscillator 9. By tuning the local oscillator in a fashion which relates to the ground speed of the vehicle, doppler shifts and return signals of stationary targets are, in a sense, tuned out. That is, as the velocity of the vehicle varies, the return signals will have different frequencies as a result of doppler shifts imposed upon the carrier frequency; however, by tuning the local oscillator commensurately with the vehicle ground speed, the IF frequency can be held to be very closely the same. Of course, this frequency tracking at optical frequencies can be achieved only with limited accuracy, so that some variation in the IF frequency must be expected. However, as described more fully hereinafter, the present system accommodates such variations.

The velocity input means 13 may simply comprise means for deriving a voltage from the inertial system of the aircraft; on the other hand, since many aircraft, such as helicopters, are currently provided with doppler ground speed indicators, the velocity input means 13 may derive a voltage indicative of speed from such a doppler ground speed indicator. Or, it could derive a voltage indicative of ground speed from doppler signal processing within this system. If the scan of the antenna 1 can be altered with respect to the heading of the aircraft, so as to point the radar into a turn, then the velocity input sensor 13 must also take into account the angular components of velocity as well as speed; this is so because when the antenna is pointing in a direction which is squinted with respect to the heading of the aircraft, then there will be less doppler shift of the return signals than there is when the antenna is scanning in the direction of the velocity vector of the aircraft. On the other hand, the velocity input means 13, although not shown to be connected with the antenna 1, may have an input which imposes a trigonometric function upon the speed-derived voltage as a function of relative positioning of the antenna with respect to the vehicle.

As a result of the beam splitter 7, components of the incoming signal on the optical path 6 and the local oscillator signal on the optical path 8 are provided along an optical path 14 to an optical or photo detector 15. The detector 15 preferably has a nonlinear, square law characteristic so as to provide an electric signal on a line 16 having a frequency which is the difference between the frequency of the two incoming optical waves on the paths 6 and 8. The detector 15 may comprise a mercury-cadmium-telluride (HgCdTe) photo diode. As an example, the local oscillator 9 may be adjusted to be 30 MHz away from the doppler shifted return signal frequency from the transmitter 5, so as to provide signals on the line 16 at approximately 30 MHz. These signals are applied to a normal IF amplifier which may preferably operate at a center frequency around 30 MHz with a bandwidth of 2 or 3 MHz.

The output of the IF amplifier is applied over a signal line 18 to signal processing circuitry 19 which comprise any form of suitable radar video signal processing of the type currently employed in microwave and millimeter radars, in dependence upon the use to which the present system is to be put. For instance, if this is a simple search radar, the signal processing means 19 may simply shape the video and apply it over suitable signal lines 20 to a display 21 which may comprise an A scope or a PPI scope, etc., as is well known in the art. On the other hand, in more sophisticated applications, slant range processing, range integration, imaging, and other radar video signal processing functions may be performed therein. All of this is totally immaterial to the present invention.

The transmitter 5 may preferably comprise a laser transmitter of the type disclosed and claimed in a copending application of the same assignee entitled FREQUENCY CONTROLLED, PASSIVELY Q-SWITCHED LASER, Ser. No. 247,679, filed on even date herewith by M. L. Skolnick and C. J. Buczek. That transmitter utilizes a low pressure gas saturable absorber such as sulfer hexafluoride to passively Q-switch a laser cavity which may, for instance, comprise a laser gain medium including carbon dioxide. The output pulses are monitored and used to control the resonance of the cavity so as to stabilize both the carrier frequency and the pulse repetition frequency. In that case, it is found that the aforementioned laser provides a substantially Gaussian output pulse with a half power pulse-width on the order of 0.1 to 1.0 microsecond. In such a case, the PRF of the transmitter is caused to be orders of magnitude less than the bandwidth of the receiver amplifier 17, on the order of 20–50 KHz.

The radar system just described employs the present invention in that it provides a receiver having a bandwidth which is in excess of the bandwidth required for the data rates involved, but is extended so as to accommodate carrier frequency variations unrelated to data; in this case the carrier frequency variations are partly due to variations in the transmitter carrier frequency or the local oscillator carrier frequency and to the inability to track the local oscillator perfectly with respect to vehicle velocity; but to a great extent, are due to the variations in frequency resulting from uncontrollable and indeterminate doppler shifts in the carrier frequency which result from antenna scanning and relative motion with respect to targets, such as vehicles and wires and other objects moving in the wind or otherwise. The invention may also be practiced to advantage in other laser transmitter/receiver systems, such as communication systems. For instance, in a digital data link, where coherent detection is used, it may be desirable to use extremely low cost transmitters and local oscillators, so that the IF frequency may vary to an extent which exceeds the bandwidth required for the information content. In such a case, a receiver having an extremely large bandwidth may be provided, and the PRF and pulsewidth of the transmitter adjusted accordingly so as to take advantage of the present invention: that is, providing peak power which is much in excess of average power in a coherent detection system, unlike systems of the prior art where peak power and average power have the same effect upon signal to noise ratio, so that simpler, more easily controlled cw laser transmitters are utilized instead of the more difficult to control pulsed laser transmitters.

Thus, although the invention has been shown and described with respect to a preferred embodiment thereof, it should be understood by those skilled in the art that the foregoing and various other changes and omissions in the form and detail thereof may be made therein without departing from the spirit and the scope of the invention.

Having thus described a typical embodiment of our invention, that which we claim as new and desire to secure by Letters Patent of the United States is;

1. A laser radar system having a radar return signal data rate on the order of 20–50 KHz, and adapted to be disposed for use upon a moving vehicle, comprising:

a pulsed $CO_2$ laser transmitter passively Q-switched with a low pressure sulfer hexafluoride gas saturable absorber producing a Gaussian output pulse having a half power pulsewidth on the order of from 0.1 microsecond to 1.0 microsecond and transmitting at a PRF as low as will accomodate said data rate, on the order of 20–50 KHz;

a cw laser local oscillator;

a laser signal heterodyning means optically responsive to said local oscillator;

laser antenna means including means optically connected with the laser transmitter and with said heterodyning means and including means for transmitting energy supplied thereto by said transmitter and for receiving laser energy incident thereupon from outside of said system and applying said received laser energy to said heterodyning means;

said heterodyning means including a detector responsive to laser energy applied thereto for providing an electrical signal at a frequency equal to the difference between the frequencies of the received laser signal and the laser signal from said local oscillator;

means providing a signal as a function of the velocity of said vehicle for adjusting the frequency of said local oscillator in a manner to provide an IF frequency which is substantially constant independently of doppler shifts which occur in return signals as a result of the relative velocity of the vehicle with respect to earth at the carrier frequency of said transmitter; and receiver amplifier means responsive to said detector means, said receiver amplifier means having a center frequency which is substantially equal to said substantially constant IF frequency, said receiver amplifier means having a bandwidth on the order of 1 MHz to 3 MHz which is substantially equal to the doppler shift in received laser signals resulting from targets having velocity components along the velocity vector of the vehicle on the order of tens of miles per hour at the carrier frequency of said transmitter.

* * * * *